United States Patent
Tu et al.

(10) Patent No.: US 11,108,035 B2
(45) Date of Patent: Aug. 31, 2021

(54) SOLID-STATE POSITIVE ELECTRODE, METHOD OF MANUFACTURE THEREOF, AND BATTERY INCLUDING THE ELECTRODE

(71) Applicants: Samsung Electronics Co., Ltd., Suwon-si (KR); The Regents of the University of California, Oakland, CA (US)

(72) Inventors: Qingsong Tu, Berkeley, CA (US); Tan Shi, Berkeley, CA (US); Gerbrand Ceder, Berkeley, CA (US); Lincoln Miara, Lincoln, MA (US)

(73) Assignees: SAMSUNG ELECTRONICS CO., LTD., Gyeonggi-Do (KR); THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 17 days.

(21) Appl. No.: 16/459,896

(22) Filed: Jul. 2, 2019

(65) Prior Publication Data
US 2020/0220159 A1  Jul. 9, 2020

Related U.S. Application Data

(60) Provisional application No. 62/789,812, filed on Jan. 8, 2019, provisional application No. 62/823,509, filed on Mar. 25, 2019.

(51) Int. Cl.
| | |
|---|---|
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC .......... *H01M 4/362* (2013.01); *H01M 4/505* (2013.01); *H01M 4/525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | |
|---|---|---|
| 10,090,557 B2 | 10/2018 | Trevey et al. |
| 2012/0028128 A1 | 2/2012 | Seino et al. |
| 2013/0040206 A1 | 2/2013 | Yoshida et al. |

(Continued)

OTHER PUBLICATIONS

Strauss, F., et al., "Impact of Cathode Material Particle Size on the Capacity of Bulk-Type All-Solid-State Batteries", ACS Energy Letters, 2018, 3, pp. 992-996.

(Continued)

*Primary Examiner* — Daniel S Gatewood
(74) *Attorney, Agent, or Firm* — Cantor Colburn LLP

(57) ABSTRACT

A positive electrode for a solid-state lithium battery, the positive electrode including: a positive active material; and a first solid electrolyte, wherein a ratio λ of an average particle diameter of the positive active material to an average particle diameter of the first solid electrolyte is $3 \leq \lambda \leq 40$, wherein the positive active material has an average particle diameter of 1 μm to 30 μm, and wherein the first solid electrolyte has an average particle diameter of 0.1 μm to 4 μm.

9 Claims, 7 Drawing Sheets
(3 of 7 Drawing Sheet(s) Filed in Color)

(56) References Cited

U.S. PATENT DOCUMENTS

| | | | | |
|---|---|---|---|---|
| 2016/0181657 A1* | 6/2016 | Kawaji | ............ | H01M 10/0585 |
| | | | | 429/162 |
| 2017/0092987 A1 | 3/2017 | Haga et al. | | |
| 2017/0092988 A1* | 3/2017 | Haga | .................. | H01M 4/0435 |
| 2017/0214051 A1 | 7/2017 | Yoon et al. | | |
| 2017/0288260 A1* | 10/2017 | Woehrle | ............ | H01M 10/0566 |
| 2018/0114979 A1 | 4/2018 | Yoon et al. | | |

OTHER PUBLICATIONS

Strauss, F., et al., Supporting Information for "Impact of Cathode Material Particle Size on the Capacity of Bulk-Type All-Solid-State Batteries", published in ACS Energy Letters, 2018, 3, pp. 992-996, supplemental pp. S1-S8.
European Search Report for European Application No. 20150457.8, Date of Filing Jan. 7, 2020, dated May 25, 2020, 7 pages.

* cited by examiner

SOLID-STATE POSITIVE ELECTRODE, METHOD OF MANUFACTURE THEREOF, AND BATTERY INCLUDING THE ELECTRODE

CROSS-REFERENCE TO RELATED APPLICATIONS

This application claims priority to U.S. Provisional Patent Application No. 62/789,812, filed on Jan. 8, 2019, and U.S. Provisional Patent Application No. 62/823,509, filed on Mar. 25, 2019, both of which were filed in the United States Patent and Trademark Office, and all the benefits accruing therefrom under 35 U.S.C. § 119, the contents of both of which are incorporated herein in their entirety by reference.

BACKGROUND

1. Field

Disclosed is a solid-state positive electrode, method of manufacture thereof, and an electrochemical cell including the electrode.

2. Description of the Related Art

Solid-state lithium batteries are of interest because they can potentially offer improved specific energy and energy density, and improved safety, and in some configurations improved power density. However, the performance of currently available solid-state lithium batteries illustrates the performance gap between currently available lithium-ion batteries using flammable liquid electrolytes and solid-state alternatives. Desired is a positive electrode material having improved performance and safety properties associated with a solid-state material, without the flammability of the liquid carbonate solvents used in liquid electrolytes. Thus there remains a need for an improved solid-state lithium-ion positive electrode material, and an electrochemical cell including the same.

SUMMARY

Disclosed is a positive electrode for a solid-state lithium battery, the positive electrode including: a positive active material, and a first solid electrolyte, wherein a ratio $\lambda$ of an average particle diameter of the positive active material to an average particle diameter of the first solid electrolyte is $3 \leq \lambda \leq 40$, wherein the positive active material has an average particle diameter of 1 µm to 30 µm, and wherein the first solid electrolyte has an average particle diameter of 0.1 µm to 4 µm.

Also disclosed is a positive electrode assembly for a solid-state lithium battery, the assembly including: the positive electrode; and a second solid electrolyte on the positive electrode, wherein the first solid electrolyte and the second solid electrolyte are the same or different.

Also disclosed is a solid-state lithium battery including: the positive electrode; a negative electrode; and a second solid electrolyte between the positive electrode and the negative electrode, wherein the first solid electrolyte and the second solid electrolyte are the same or different.

Also disclosed is a method of manufacturing a positive electrode, the method including, providing a positive active material; providing a first solid electrolyte; and contacting the positive active material and the first solid electrolyte with a pressure of 50 megaPascals to 600 megaPascals to provide the positive electrode.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other advantages and features of this disclosure will become more apparent by describing in further detail exemplary embodiments thereof with reference to the accompanying drawings, in which.

Figure 1:
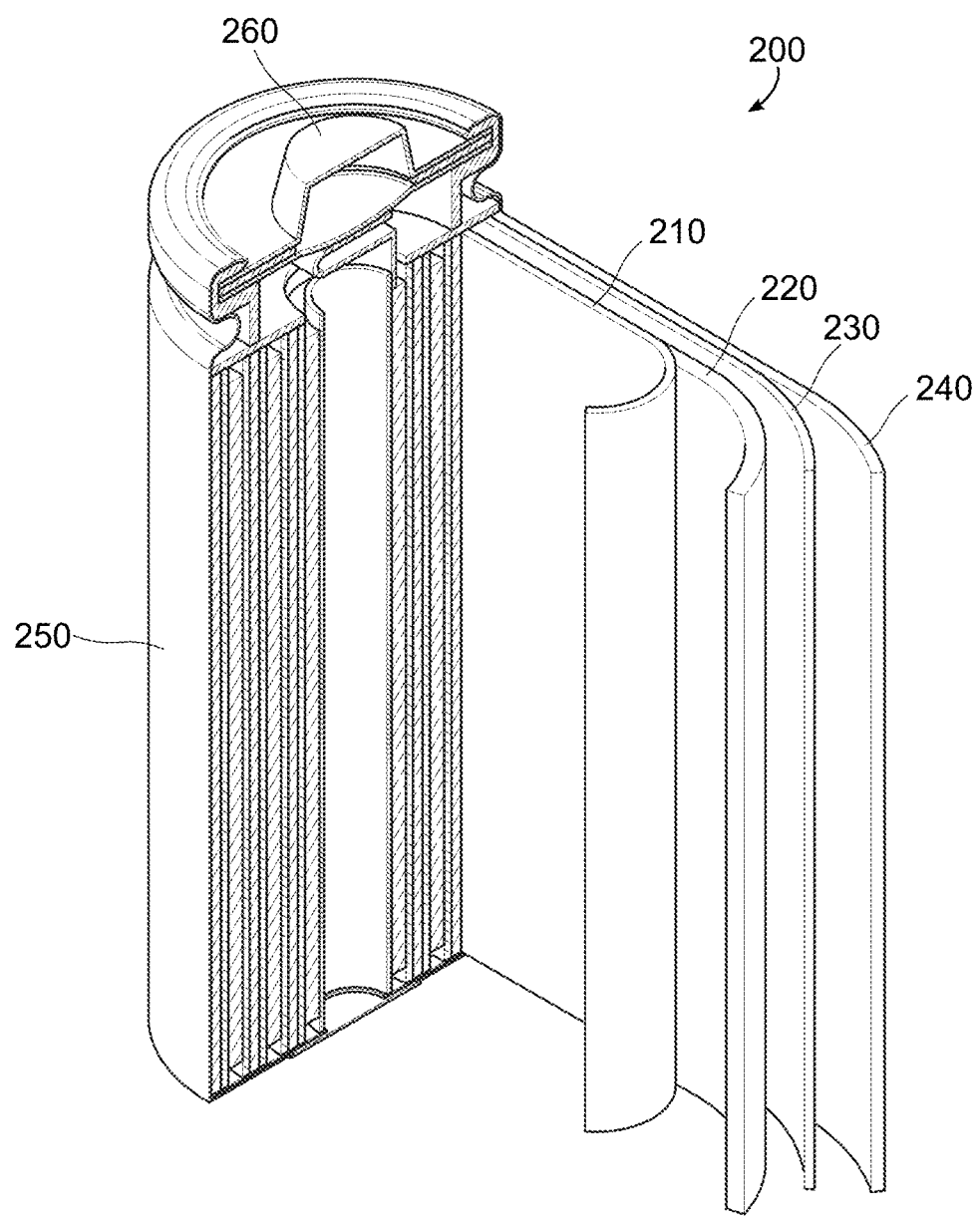
FIG. 1 is a schematic illustration of a battery.

The above described and other features are exemplified by the following figures and detailed description.

DETAILED DESCRIPTION

Solid-state lithium batteries are intriguing because they potentially offer specific energy and energy density competitive with liquid-electrolyte alternatives, without the safety issues associated with liquid electrolytes. However, effects that are not present in lithium batteries using liquid electrolytes, such as degradation of solid electrolytes resulting from reaction of the solid electrolyte and conductive diluents used in positive electrodes developed for liquid electrolytes, highlight significant differences between materials for solid-state lithium or lithium-ion batteries and those for lithium or lithium-ion batteries using liquid electrolytes. Thus materials developed for lithium or lithium-ion batteries using liquid electrolytes, in particular those using a lithium nickel oxide positive active material, e.g., an NCM of the formula $Li_{1+x}(Ni_{1-x-y-z}Co_yMn_z)_{1-x})O_2$, have been shown to be unsuitable for use in solid-state lithium or lithium-ion batteries.

Recently publications espouse use of small particle size NCM positive active material, e.g., a $d_{50}$ particle size of less than 4 μm, to overcome charge transport restrictions. The Applicants have discovered previously undisclosed interactions between the positive active material and solid electrolyte materials. While not wanting to be bound by theory, it is understood that when the positive active material is considered alone, charge transport restrictions in a positive active material, such as NCM, motivate use of small particle sizes, e.g., 4 μm or less. It has been discovered that the interactions between the positive electrode material and the solid electrolyte are often more significant than charge transport restrictions in the positive active material. In detail, ionic transport limitations at particle surfaces and between positive active material particles and solid electrolyte particles have been discovered to be of such significance that improved performance can be provided by using a selected combination of positive active material particle size and solid electrolyte particle size, particularly when using a nickel-containing positive active material, such as NCM. In particular, and while not wanting to be bound by theory, the disclosed interactions suggest that when using a positive active material such as NCM in combination with a solid electrolyte, use of a relatively large positive active material particle size in combination with a relatively small particle size of a solid electrolyte provides improved performance.

Disclosed is positive electrode for a solid-state lithium battery. The positive electrode comprises: a positive active material; and a first solid electrolyte, wherein a ratio λ of an average particle diameter of the positive active material to an average particle diameter of the first solid electrolyte is $$3 \leq \lambda \leq 40,$$

wherein the positive active material has an average particle diameter of 1 μm to 30 μm, and wherein the first solid electrolyte has an average particle diameter of 0.1 μm to 4.0 μm.

The positive active material can comprise a lithium transition metal oxide, a transition metal sulfide, or the like. For example, the positive active material can include a composite oxide of lithium and a metal selected from nickel, cobalt, and manganese. For example, the positive active material can be a compound represented by any of the Formulas: $Li_pM^1_{1-q}M^2_qD_2$ wherein $0.90 \leq p \leq 1.8$ and $0 \leq q \leq 0.5$; $Li_pE_{1-q}M^2_qO_{2-x}D_x$ wherein $0.90 \leq p \leq 1.8$, $0 \leq q \leq 0.5$, and $0 \leq x \leq 0.05$; $LiE_{2-q}M^2_qO_{4-x}D_x$ wherein $0 \leq q \leq 0.5$ and $0 \leq x \leq 0.05$; $Li_pNi_{1-q-r}Co_qM^2_rD_x$ wherein $0.90 \leq p \leq 1.8$, $0 \leq q \leq 0.5$, $0 \leq r \leq 0.05$, and $0 \leq x \leq 2$; $Li_pNi_{1-q-r}Co_qM^2_rO_{2-x}X_x$ wherein $0.90 \leq p \leq 1.8$, $0 \leq q \leq 0.5$, $0 \leq r \leq 0.05$, and $0 < x < 2$; $Li_pNi_{1-q-r}Co_qM^2_rO_{2-x}X_x$ wherein $0.90 \leq p \leq 1.8$, $0 \leq q \leq 0.5$, $0 \leq r \leq 0.05$, and $0 < x < 2$; $Li_pNi_{1-q-r}Mn_qM^2_rD_x$ wherein $0.90 < p < 1.8$, $0 < q < 0.5$, $0 < r < 0.05$, and $0 < x < 2$; $Li_pNi_{1-q-r}Mn_qM^2_rO_{2-p}X_x$ wherein $0.90 < p < 1.8$, $0 \leq q \leq 0.5$, $0 \leq r \leq 0.05$, and $0 < x < 2$; $Li_pNi_{1-q-r}Mn_qM^2_rO_{2-x}X_x$ wherein $0.90 \leq p \leq 1.8$, $0 \leq q \leq 0.5$, $0 \leq r \leq 0.05$, and $0 < x < 2$; $Li_pNi_qE_rG_dO_2$ wherein $0.90 \leq p \leq 1.8$, $0 \leq q \leq 0.9$, $0 \leq r \leq 0.5$, and $0.001 \leq d \leq 0.1$; $Li_pNi_qCo_rMn_dGeO_2$ wherein $0.90 \leq p \leq 1.8$, $0 \leq q \leq 0.9$, $0 \leq r \leq 0.5$, $0 < d < 0.5$, and $0.001 \leq e \leq 0.1$; $Li_pNiG_qO_2$ wherein $0.90 \leq p \leq 1.8$ and $0.001 \leq q \leq 0.1$; $Li_pCoG_qO_2$ wherein $0.90 \leq p \leq 1.8$ and $0.001 \leq q \leq 0.1$; $Li_pMnG_qO_2$ where $0.90 \leq p \leq 1.8$ and $0.001 \leq q \leq 0.1$; $Li_pMn_2G_qO_4$ wherein $0.90 \leq p \leq 1.8$ and $0.001 \leq q \leq 0.1$; $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ wherein $0 \leq f \leq 2$; and $LiFePO_4$, in which in the foregoing positive active materials $M^1$ is Ni, Co, or Mn; $M^2$ is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where $x=1$ or 2, $LiNi_{1-x}Mn_xO_{2x}$ where $0<x<1$, $LiNi_{1-x-y}Co_xMn_yO_2$ where $0 \leq x \leq 0.5$ and $0 \leq y \leq 0.5$, $LiFePO_4$, $TiS_2$, $FeS_2$, $TiS_3$, and $FeS_3$.

In an implementation, the positive active material may include lithium cobalt oxide, lithium nickel cobalt manganese oxide, lithium nickel cobalt aluminum oxide, or a combination thereof. Mentioned is an aspect in which the positive active material is a NCA or NCM material represented by $Li_xNi_yE_zG_dO_2$ wherein $0.90 \leq x \leq 1.8$, $0 \leq y \leq 0.9$, $0 \leq z \leq 0.5$, $0.001 \leq d \leq 0.1$, E is Co, and G is Al, Cr, Mn, Fe, Mg, La, Ce, Sr, V, or a combination thereof. An implementation in which y is 5, E is Co, G is Mn, z is 3, and d is 2, i.e., $LiNi_{0.5}Co_{0.3}Mn_{0.2}O_2$, (NCM532) is mentioned.

The positive electrode comprises the positive active material and a first solid electrolyte. In an aspect the positive electrode consists of the positive active material and the first solid electrolyte.

The first solid electrolyte may comprise a sulfide solid electrolyte, and may comprise $Li_2S$—$P_2S_5$, $Li_2S$—$P_2S_5$—LiX, wherein X is a halogen element, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, wherein m and n are positive numbers, Z is one of Ge, Zn or Ga, $Li_2S$—$GeS_2$, $Li_2S$—$SiS_2$—$Li_3PO_4$, $Li_2S$—$SiS_2$—$Li_pM^1O_q$ wherein p and q are positive numbers, $M^1$ is P, Si, Ge, B, Al, Ga, or In, $Li_{7-x}PS_{6-x}Cl_x$ wherein $0<x<2$, $Li_{7-x}PS_{6-x}Br_x$ wherein $0<x<2$, or $Li_{7-x}PS_{6-x}I_x$ wherein $0<x<2$. Mentioned are $Li_6PS_5Cl$, $Li_6PS_5Br$, or $Li_6PS_5I$.

The first solid electrolyte may comprise an oxide solid electrolyte, and may comprise $Li_{1+x+y}Al_xTi_{2-x}Si_yP_{3-y}O_{12}$ wherein $0<x<2$, $0 \leq y<3$, $BaTiO_3$, $Pb(Zr_{(1-x)}Ti_x)O_3$ wherein $0 \leq x \leq 1$, $Pb_{1-x}La_xZr_{1-y}Ti_yO_3$ wherein $0 \leq x<1$, $0 \leq y<1$, $Pb(Mg_{1/3}Nb_{2/3})O_3$—$PbTiO_3$, $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, $Li_3PO_4$, $Li_xTi_y(PO_4)_3$ wherein $0<x<2$, $0<y<3$), $Li_xAl_yTi_z(PO_4)_3$, $0<x<2$, $0<y<1$, $0<z<3$), $Li_{1+x+y}(Al_{(1-m)}Ga_m)_x(Ti_{(1-n)}Ge_n)_{2-x}Si_yP_{3-y}O_{12}$ ($0 \leq x \leq 1$, $0 \leq y \leq 1$, $0 \leq m \leq 1$, and $0 \leq n \leq 1$, $Li_xLa_yTiO_3$ wherein $0<x<2$, $0<y<3$, $Li_xGe_yP_zS_w$ wherein $0<x<4$, $0<y<1$, $0<z<1$, and $0<w<5$, $Li_xN_y$ wherein $0<x<4$ and $0<y<2$, $SiS_2$, $Li_xSi_yS_z$ wherein $0<x<3$, $0<y<2$, $0<z<4$, $Li_xP_yS_z$ wherein $0<x<3$, $0<y<3$ and $0<z<7$, $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, a garnet ceramic of the formula $Li_{3+x}La_3M^1_2O_{12}$ wherein $M^1$ is Te, Nb or Zr and x is an integer of 1 to 10, or a combination thereof. Mentioned is $(La_{1-x}Li_x)TiO_3$ (LLTO) wherein $0<x<1$.

The oxide solid electrolyte may comprise an oxide of the formula $Li_{5+x}E_3(Me^2_zMe^2_{(2-z)})O_d$ wherein E is a trivalent cation; $Me^1$ and $Me^2$ are each independently one of a trivalent, tetravalent, pentavalent, and a hexavalent cation;

$0<x\leq3$, $0\leq z<2$, and $0<d\leq12$; and O can be partially or totally substituted with a pentavalent anion, a hexavalent anion, a heptavalent anion, or a combination thereof. For example, E can be partially substituted with a monovalent or divalent cation. In another embodiment, for example, in the solid ion conductor, when $0<x\leq2.5$, E may be La and $Me^2$ can be Zr. In an aspect, the oxide can be of the formula $Li_{5+x+2y}(D_y E_{3-y})(Me^1{}_z Me^2{}_{2-z})O_d$ wherein D is a monovalent or divalent cation; E is a trivalent cation; $Me^1$ and $Me^2$ are each independently a trivalent, tetravalent, pentavalent, or a hexavalent cation; $0<x+2y\leq3$, $0<y\leq0.5$, $0\leq z<2$, and $0<d\leq12$; and O can be partially or totally substituted with a pentavalent anion, a hexavalent anion, a heptavalent anion, or a combination thereof. The preferred number of moles of lithium per formula unit (Li-pfu) in the above formula is $6<(5+x+2y)<7.2$, $6.2<(5+x+2y)<7$, $6.4<(5+x+2y)<6.8$. In the garnet-type oxides of the above formulas, D can comprise potassium (K), rubidium (Rb), cesium (Cs), calcium (Ca), barium (Ba), or strontium (Sr). In an embodiment, D is calcium (Ca), barium (Ba), or strontium (Sr). In the above formulas, Me can be a transition metal. For example, Me can be tantalum (Ta), niobium (Nb), yttrium (Y), scandium (Sc), tungsten (W), molybdenum (Mo), antimony (Sb), bismuth (Bi), hafnium (Hf), vanadium (V), germanium (Ge), silicon (Si), aluminum (Al), gallium (Ga), titanium (Ti), cobalt (Co), indium (In), zinc (Zn), or chromium (Cr). Mentioned is $Li_{6.5}La_3Zr_{1.5}Ta_{0.5}O_{12}$.

As noted above, unexpectedly improved performance is provided when a ratio λ of an average particle diameter of the positive active material to an average particle diameter of the first solid electrolyte is $3\leq\lambda\leq40$, wherein the positive active material has an average particle diameter of 1 μm to 30 μm, and wherein the first solid electrolyte has an average particle diameter of 0.1 μm to 4 μm. In an aspect, $3.5\leq\lambda\leq38$, $4\leq\lambda\leq35$, $4.5\leq\lambda\leq30$, $5\leq\lambda\leq25$, or $5.5\leq\lambda\leq20$. Also, as noted above, use of a relatively large positive active material particle size, contrary to prior teaching, in combination with a relatively small particle size of a solid electrolyte, provides improved performance. The average particle diameter of the positive active material may be 1 micrometer (μm) to 30 μm, 2 μm to 25 μm, 4 μm to 20 μm, 6 to 18 μm, 8 μm to 16 μm, or 10 μm to 14 μm, and the first solid electrolyte may have an average particle diameter of 0.1 μm to 4 μm, 0.1 μm to 3.8 μm, 0.2 μm to 3.6 μm, 0.3 μm to 3.4 μm, 0.4 μm to 3.2 μm, or 0.5 μm to 3 μm. As noted above, when the positive active material and the first solid electrolyte have a size within the foregoing range, unexpectedly improved performance is provided.

As used herein, "average particle size," "average particle diameter," or "D50 particle size" refers to a particle diameter corresponding to 50% of the particles in a distribution curve in which particles are accumulated in the order of particle diameter from the smallest particle to the largest particle and a total number of accumulated particles is 100%. The average particle size may be measured by methods known to those of skill in the art. For example, the average particle size may be as determined with a commercially available particle size analyzer by, e.g., dynamic light scattering, or may be measured using a transmission electron microscope (TEM) or a scanning electron microscope (SEM). When determined by TEM or SEM, an average longest dimension of a particle may be used.

The positive active material and the first solid electrolyte may have any suitable particle size or particle diameter distribution. In an aspect, a particle diameter distribution of a combination of the positive active material and the first solid electrolyte is a bimodal distribution. A trimodal, or other multi-modal distribution is mentioned. The disclosed particle size and particle size distribution can be provided by ball milling, jet milling, grinding, sieving, or a combination thereof.

In an aspect, a content of the positive active material in the positive electrode, e.g., a loading of the positive active material in the positive electrode, is 60 weight percent (wt %) to 90 wt %, 65 wt % to 88 wt %, or 70 wt % to 85 wt %, based on a total weight of the positive electrode. While not wanting to be bound by theory, it is understood that use of the above-mentioned combination of positive active material and first solid electrolyte having the disclosed particle sizes permits use of the disclosed content of the positive active material in the positive electrode.

In an aspect, the positive electrode has a porosity of less than 25 percent (%), 0.01% to 25%, 0.1% to 20%, 0.5% to 15%, or 1% to 10%, based on a total volume of the positive electrode. While not wanting to be bound by theory, it is understood that use of the above-mentioned combination of particle sizes of the positive active material and the first solid electrolyte permits use of the above-disclosed porosity while also providing suitable performance, e.g., specific capacity, energy density, or power density. When the above-mentioned combination of particle sizes of the positive active material and the first solid electrolyte are used, improved packing density results in improved specific energy and energy density.

Also, a content of the positive active material may be 30 volume percent (vol %) to 80 vol %, 35 vol % to 75 vol %, or 40 vol % to 70 vol %, based on a total volume of the positive electrode.

Also, in the positive electrode, a content of the first solid electrolyte may be 10 wt % to 40 wt %, 15 wt % to 35 wt %, or 20 wt % to 25 wt %, based on a total weight of the positive electrode. Use of the foregoing content of the first solid electrolyte permits use of a greater amount of positive active material, enhancing specific capacity and energy density.

As noted above, the disclosed positive electrode provides improved performance. In an aspect, improved specific energy is provided. In an aspect wherein the positive active material is a transition metal oxide comprising nickel and cobalt, the positive electrode active material provides 110 to 175 milliampere-hours per gram (mAh/g), 120 to 165 mAh/g, or 130 to 155 mAh/g, when a cell comprising the positive electrode is discharged at a C/20 rate at 25° C., based on a total weight of the positive active material. In an aspect, a cell comprising the positive electrode may be charged to 4.2 volts versus $Li/Li^+$ at 25° C., and then discharged at a C/20 rate at 25° C. to 3 volts versus $Li/Li^+$ to determine the capacity.

Also disclosed is a positive electrode assembly for a solid-state lithium battery, the assembly comprising: the positive electrode; and a second solid electrolyte on the positive electrode, wherein the first solid electrolyte and the second solid electrolyte are the same or different. The second solid electrolyte may comprise a sulfide solid electrolyte, an oxide solid electrolyte, or a combination thereof. In an aspect the first solid electrolyte and the second solid electrolyte are a same solid electrolyte. In an aspect the first solid electrolyte and the second solid electrolyte are different. An aspect in which the first solid electrolyte is $Li_2S$—$P_2S_5$ and the second solid electrolyte is garnet-type material, e.g., $Li_7La_3Zr_2O_{12}$, is mentioned.

Also disclosed is a solid-state lithium battery. As shown in FIG. 1, the battery 200 comprises: the positive electrode 210; a negative electrode 240; and the second solid electrolyte 220 between the positive electrode and the negative electrode, wherein the first solid electrolyte and the second solid electrolyte are the same or different. If desired, a separator 230 may be optionally included. The battery comprises a case 250 and a header 260.

The negative electrode may comprise a negative active material, which may comprise lithium metal, a lithium alloy, and may comprise any suitable material that can reversibly absorb and desorb, or intercalate and deintercalated lithium. Lithium metal, a lithium alloy, or a lithium compound, such as lithium titanium oxide, is mentioned. The negative active material may be disposed on a current collector, such as a copper current collector if desired.

Also disclosed is a method of manufacturing the positive electrode. The method comprises, providing a positive active material; providing a first solid electrolyte; contacting the positive active material and the first solid electrolyte with a pressure of 50 megaPascals to 600 megaPascals, e.g., in a press or hammer mill, to provide the positive electrode.

In an aspect, the solid-state lithium battery may be provided by disposing the second solid electrolyte between the positive electrode and the negative electrode. If desired, a separator, e.g., microporous material optionally comprising the second solid electrolyte, may be provided between the positive electrode and the negative electrode.

This disclosure is further illustrated by the following examples, which are non-limiting.

EXAMPLES

Example 1. Particle Size Ratio

Figure 2:
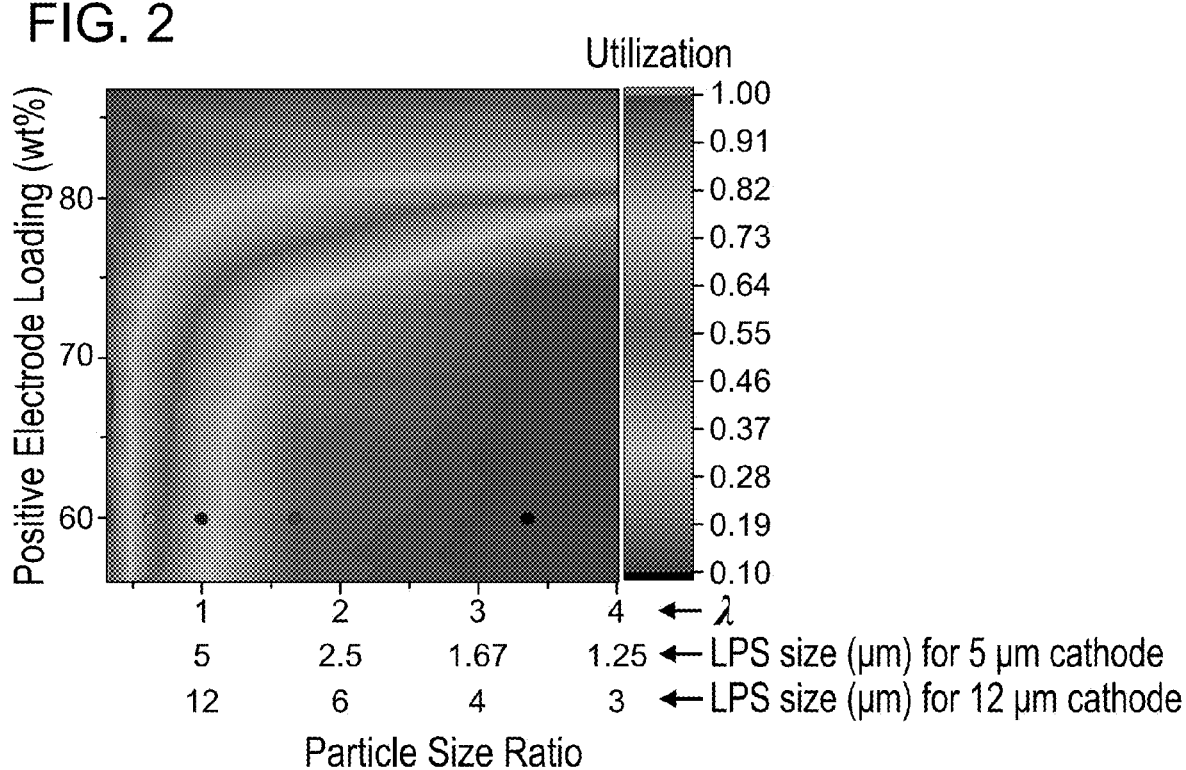
FIG. 2 is a graph of positive electrode loading (weight percent, wt %) versus the ratio $\lambda$ of the positive active material particle size versus the first solid electrolyte particle size illustrating positive active material utilization (percent) as a function of positive electrode loading and $\lambda$ for 5 µm and 12 µm $Li_2S$—$P_2S_5$ (LPS)

The particle size ratio is evaluated by determining the cathode utilization using either 5 μm positive electrode material $LiNi_{0.5}Co_{0.3}Mn_{0.2}O_2$, (NCM532) or 12 μm NCM532 and $Li_2S$—$P_2S_5$ (LPS) as the first solid electrolyte having particle sizes between 1.25 μm and 8 μm to provide a ratio λ of the positive active material particle size to the first solid electrolyte particle size of 0.625 to 8. A graph of positive electrode loading (wt % positive active material based on a total weight of the positive electrode) versus the ratio λ of the positive active material particle size to the solid electrolyte particle size is provided in FIG. 2, in which the color represents the positive electrode utilization, from 1 (green) to 0.1 (red). As shown in FIG. 2, positive electrode utilization correlates to the ratio λ. At λ less than 1, a positive electrode utilization greater than 50% is difficult to achieve. At a ratio λ of 3 or greater, a positive electrode utilization of over 82% is provided using a positive electrode loading of 70 wt % or less.

Example 2. Effect of First Solid Electrolyte Particle Size

Figure 3:
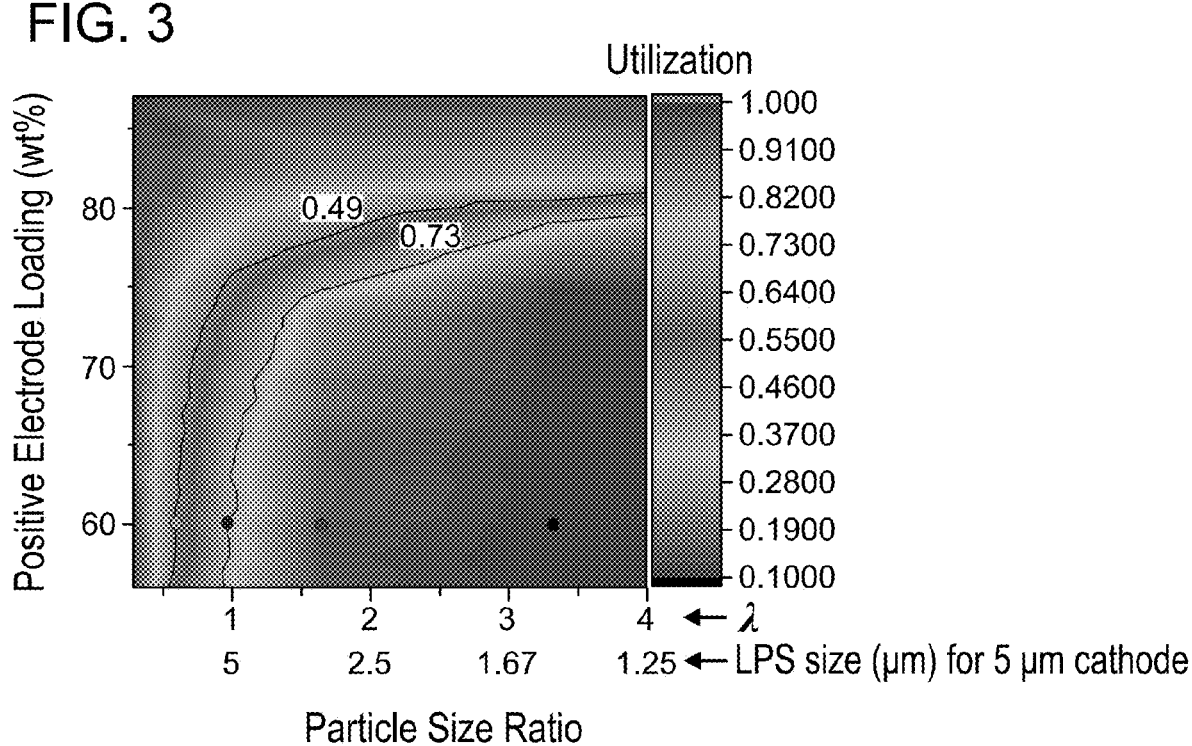
FIG. 3 is a graph of positive electrode loading (wt %) versus the ratio $\lambda$ of the positive active material particle size versus the first solid electrolyte particle size illustrating positive active material utilization (percent) as a function of positive electrode loading and $\lambda$ when using 5 µm NCM532 and LPS having a first solid electrolyte size of 1.5 µm, 3 µm, 5 µm, or 8 µm as the first solid electrolyte.
Figure 4:
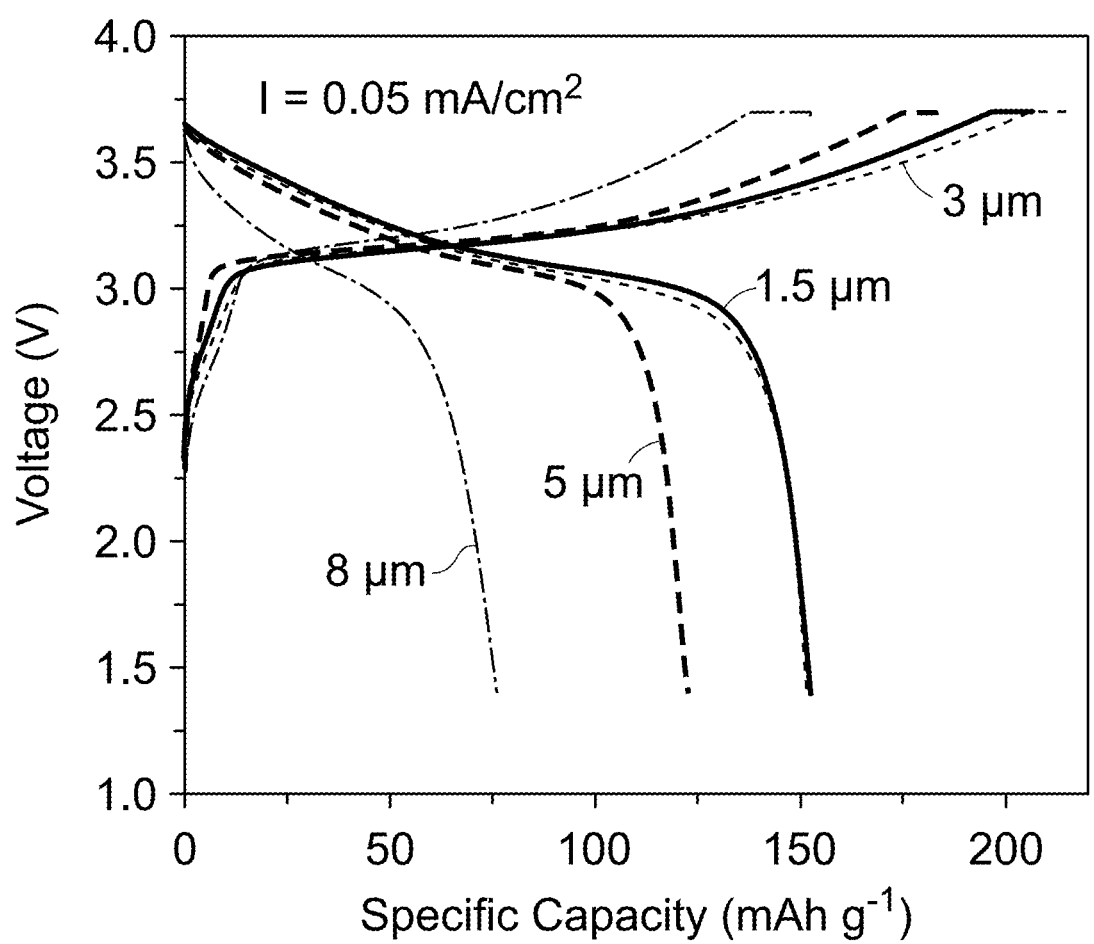
FIG. 4 is a graph of voltage (volts versus Li—In alloy) versus specific capacity (milliampere-hours per gram, mAh/g) illustrating the discharge voltage on discharge at 0.05 milliamperes per square centimeter ($mAh/cm^2$) for cells using 5 µm lithium nickel cobalt manganese oxide NCM532 and a positive electrode loading of 60 weight percent (wt %) NCM, based on a total weight of the positive electrode, and a first solid electrolyte size of 1.5 µm, 3 µm, 5 µm, or 8 µm.

Using NCM532 having a 5 μm particle size, the effect of changing the ratio λ of the positive active material particle size to the first solid electrolyte particle size was confirmed. Shown in FIG. 3 is a graph of positive electrode loading (wt % positive active material based on a total weight of the positive electrode) versus the ratio λ of the positive active material particle size to the first solid electrolyte particle size using LPS solid electrolyte having particle sizes between 1.25 μm and 8 μm. As show in FIG. 3, when the ratio λ of the positive active material particle size to the first solid electrolyte particle size is greater than 3, a utilization of greater than 82% can be provided at a positive electrode loading of 60 wt %. Shown in FIG. 4 are discharge curves at a current of 0.05 milliamperes per square centimeter for positive electrodes using 1.5 μm, 3 μm, 5 μm, or 8 μm LPS with the 5 μm NCM532 illustrating that positive electrode utilization is improved when the ratio λ is greater than 3. The discharge curves shown in FIG. 4 correspond to the points indicated at 60 wt % positive electrode loading and 8 μm, 5 μm, 3 μm, or 1.5 μm in FIG. 3.

Example 3. Effect of First Solid Electrolyte Particle Size

Figure 5:
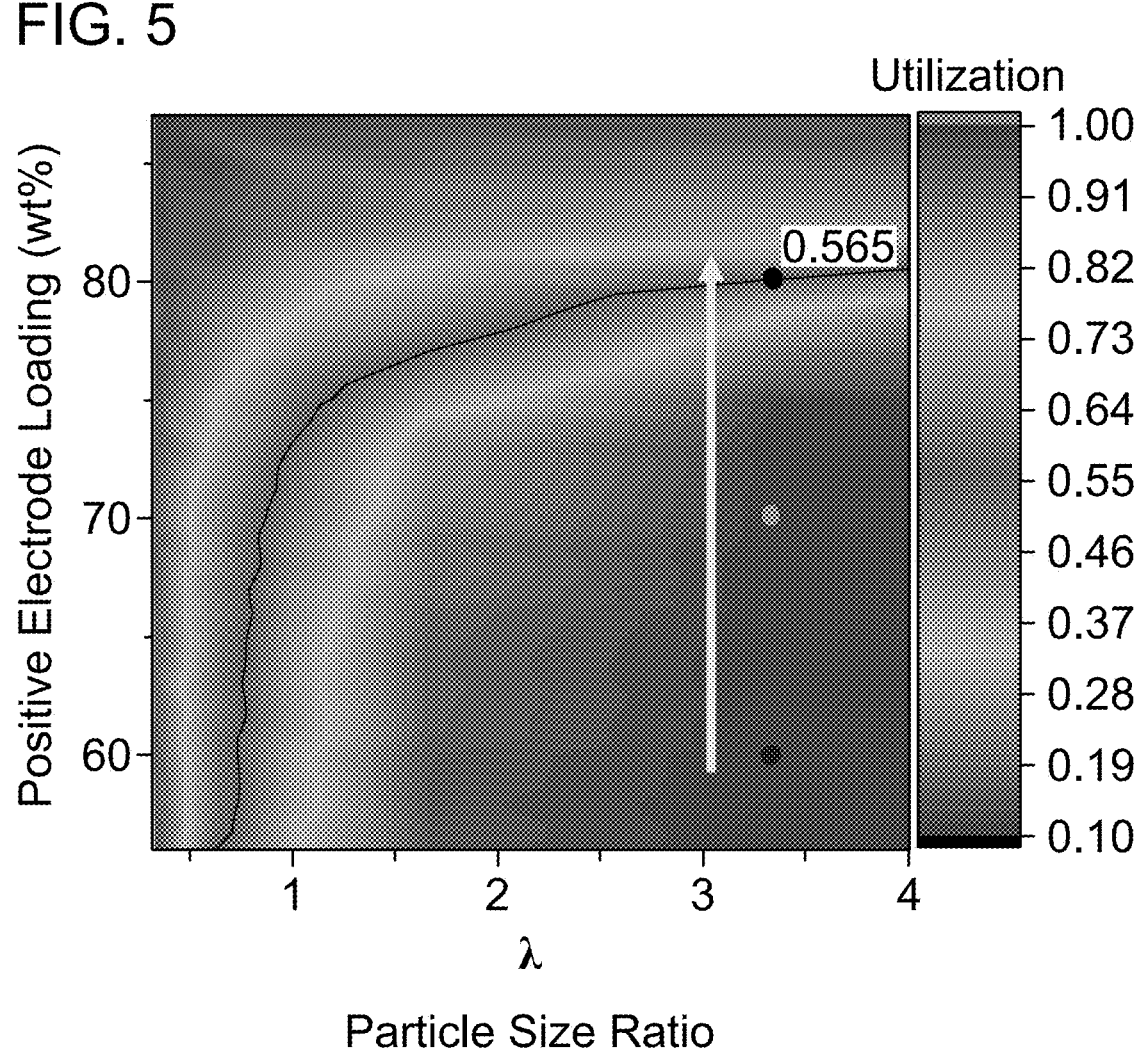
FIG. 5 is a graph of positive electrode loading (wt %) versus the ratio $\lambda$ of the positive active material particle size versus the first solid electrolyte particle size illustrating positive active material utilization (percent) as a function of positive electrode loading and $\lambda$ when using 5 µm NCM532 and LPS having a first solid electrolyte size of 1.5 µm.
Figure 6:
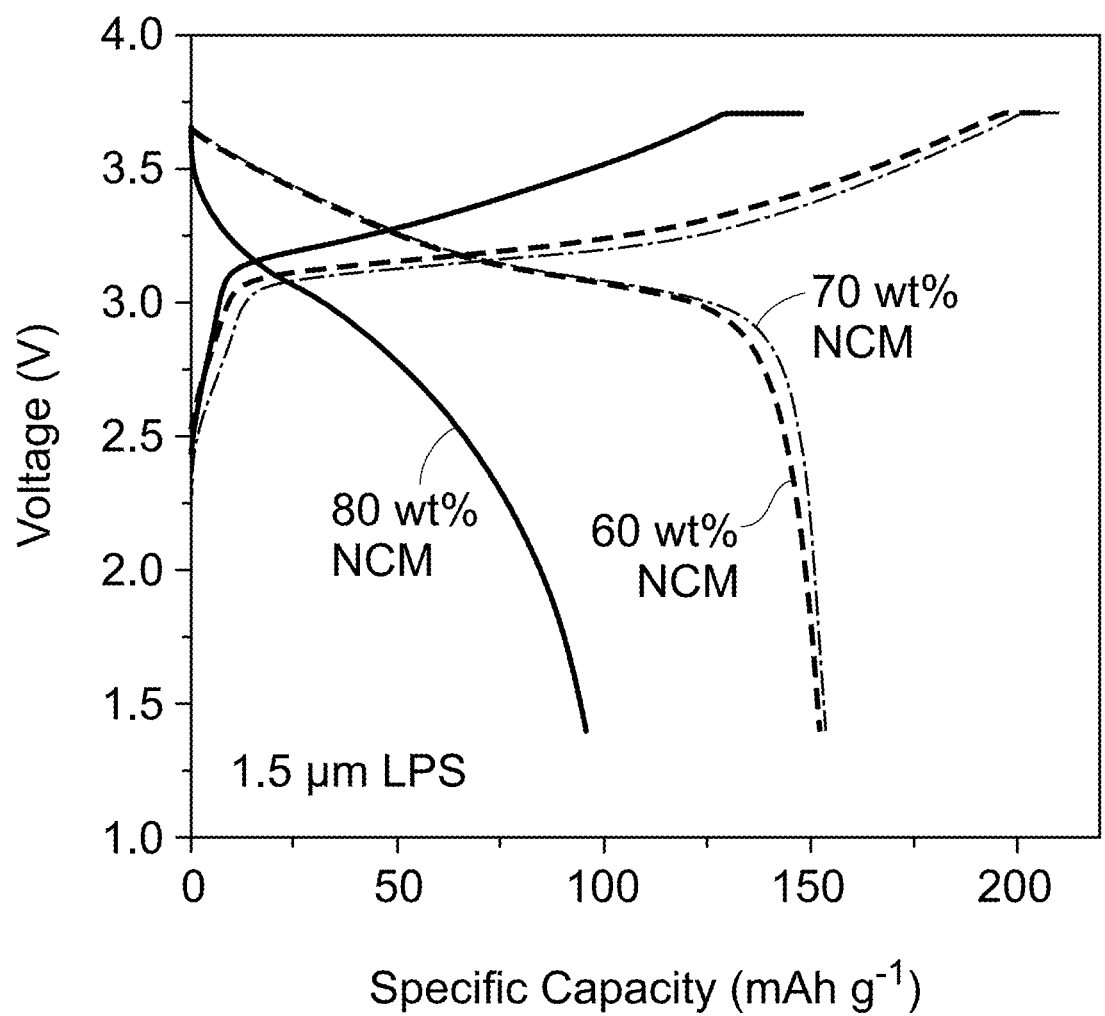
FIG. 6 is a graph of voltage (volts versus Li—In alloy) versus specific capacity (milliampere-hours per gram, mAh/g) illustrating the discharge voltage on discharge at 0.05 milliamperes per square centimeter ($mAh/cm^2$) for cells using 5 µm NCM 532 and a positive electrode loading of 60 wt %, 70 wt %, or 80 wt % of the positive active material NCM 532, based on a total weight of the positive electrode, and a first solid electrolyte size of 1.5 µm and a ratio $\lambda$ of 3.3.

The effect of the ratio λ is further evaluated using various positive electrode loadings using 5 μm NCM532 and 1.5 μm LPS as the first solid electrolyte to provide a ratio λ of 3.3. As shown in FIG. 5, a positive electrode loading of up to 70 wt % can be used when the a ratio λ is 3.3 while also providing over 82% utilization. Discharge curves for cells using the 5 μm NCM622 and 1.5 μm $Li_7P_3S_{11}$ as the first solid electrolyte at loadings of 60%, 70%, and 80% NCM622 are shown in FIG. 6. As shown, at 70 wt % NCM622 and λ=3.3, over 150 mAh/g is provided. A current of 0.05 milliamperes per square centimeter at 25° C. is used.

Example 4. First Solid Electrolyte Content and Porosity

Figure 7:
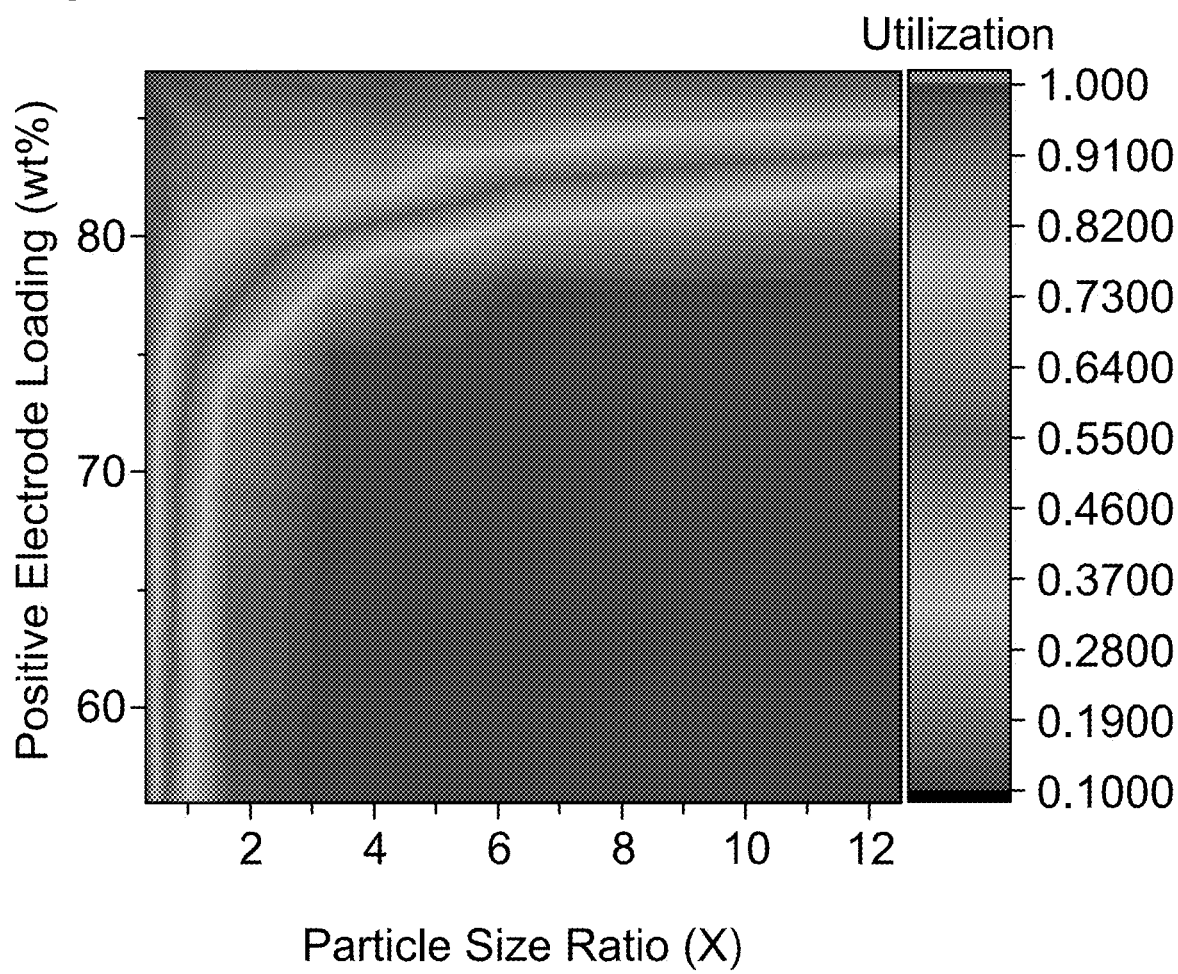
FIG. 7 is a graph of positive electrode loading (wt %) versus the ratio $\lambda$ of the positive active material particle size versus the first solid electrolyte particle size illustrating positive active material utilization (percent) as a function of positive electrode loading and $\lambda$.
Figure 8:
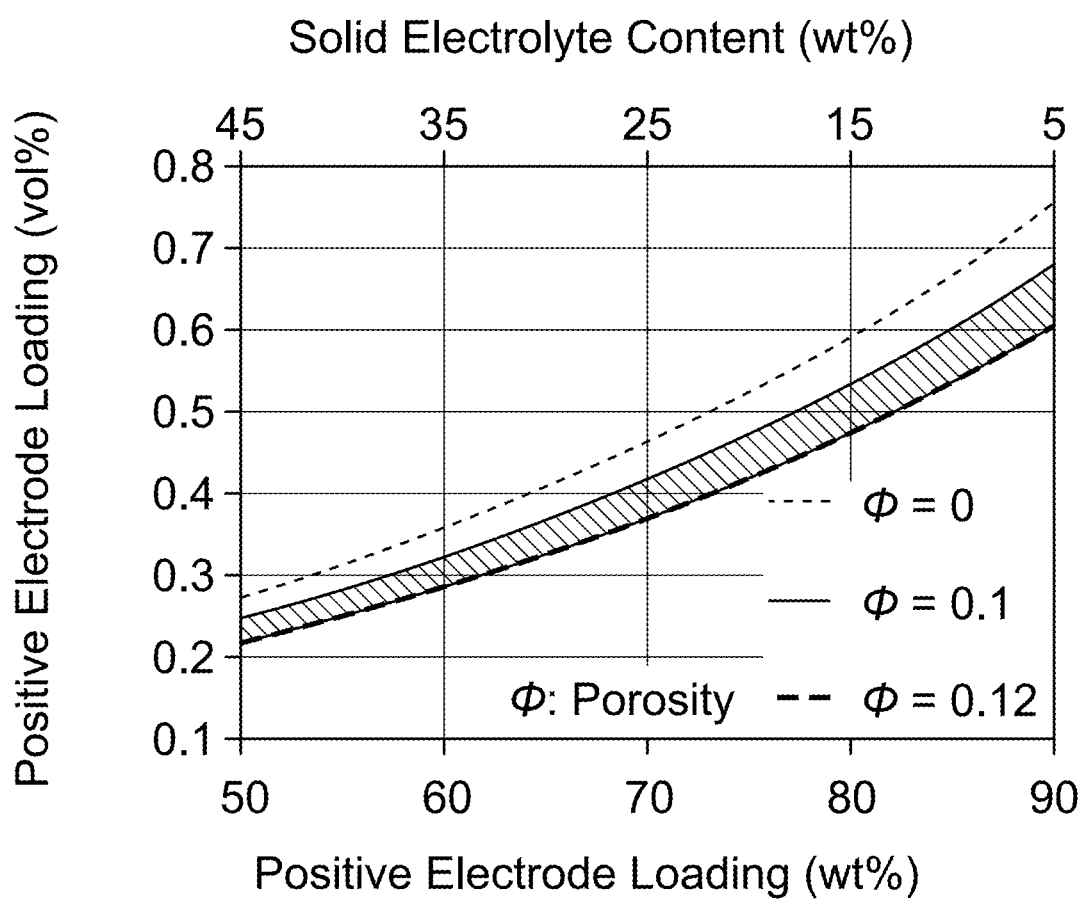
FIG. 8 is a graph of positive active material loading (volume percent, vol %) versus positive active material loading (weight percent, weight %) and first solid electrolyte content (wt %) at 0%, 10%, and 20% porosity.

The effect of the ratio λ is confirmed by the results shown in FIG. 7, illustrating the positive electrode utilization when using various combinations of NCM532 and LPS particle size to provide the ratio λ between 1 and 8. As shown, a positive electrode loading of 80 wt % can be used, e.g., 50 vol %, while providing a utilization of over 80%. As show in FIG. 8, because when using the disclosed combination of positive active material and first solid electrolyte particle size a greater fraction of positive active material an less solid electrolyte can be used, improved positive active material loading results, an effect that is enhanced at reduced porosity, e.g., 20%, 10% or 0% porosity.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A positive electrode for a solid-state lithium battery, the positive electrode comprising:
    a positive active material comprising a lithium transition metal oxide comprising nickel, cobalt, and manganese; and
    a first solid electrolyte comprising a sulfide solid electrolyte, wherein a ratio $\lambda$ of an average particle diameter of the positive active material to an average particle diameter of the first solid electrolyte is $$5.5 \leq \lambda \leq 40,$$

wherein the positive active material has an average particle diameter of 1 μm to 30 μm,
    wherein the first solid electrolyte has an average particle diameter of 0.1 μm to 4 μm, and
    wherein a content of the positive active material is 60 weight percent to 90 weight percent, based on a total weight of the positive electrode.

2. The positive electrode of claim 1, wherein a porosity of the positive electrode is less than 25 percent, based on a total volume of the positive electrode.

3. The positive electrode of claim 2, wherein a content of the positive active material is 30 volume percent to 80 volume percent, based on a total volume of the positive electrode.

4. The positive electrode of claim 2, wherein a content of the first solid electrolyte is 10 weight percent to 40 weight percent, based on a total weight of the positive electrode.

5. The positive electrode of claim 2, wherein a particle diameter distribution of the positive electrode active material and a particle diameter distribution of the first solid electrolyte is a bimodal distribution.

6. The positive electrode of claim 1, wherein the positive electrode active material provides 110 milliampere-hours per gram to 150 milliampere-hours per gram, when discharged at 0.05 milliamperes per square centimeter of the positive electrode at 25° C.

7. A positive electrode assembly for a solid-state lithium battery, the assembly comprising:
    the positive electrode of claim 1; and
    a second solid electrolyte on the positive electrode, wherein the first solid electrolyte and the second solid electrolyte are the same or different.

8. A solid-state lithium battery comprising:
    a positive electrode comprising a positive active material comprising a lithium transition metal oxide comprising nickel, cobalt, and manganese, and a first solid electrolyte comprising a sulfide solid electrolyte;
    a negative electrode; and
    a second solid electrolyte between the positive electrode and the negative electrode,
    wherein the first solid electrolyte and the second solid electrolyte are the same or different,
    wherein a ratio $\lambda$ of an average particle diameter of the positive active material to an average particle diameter of the first solid electrolyte is $$5.5 \leq \lambda \leq 40,$$

wherein the positive active material has an average particle diameter of 1 μm to 30 μm,
    wherein the first solid electrolyte has an average particle diameter of 0.1 μm to 4 μm, and
    wherein a content of the positive active material is 60 weight percent to 90 weight percent, based on a total weight of the positive electrode.

9. A method of manufacturing a positive electrode, the method comprising,
    providing a positive active material, wherein the positive active material comprises particles having an average particle diameter of 1 μm to 30 μm;

providing a first solid electrolyte, wherein the first solid electrolyte comprises particles having an average particle diameter of 0.1 μm to 4 μm; and pressing the positive active material and the first solid electrolyte particles with a pressure of 50 megaPascals to 600 megaPascals to provide the positive electrode of claim 1.

* * * * *